(12) United States Patent
Hernandez

(10) Patent No.: US 12,485,579 B2
(45) Date of Patent: Dec. 2, 2025

(54) CONCRETE MIX SEPARATING DEVICE AND METHOD OF USE

(71) Applicant: Oscar Hernandez, Bastrop, TX (US)

(72) Inventor: Oscar Hernandez, Bastrop, TX (US)

( * ) Notice: Subject to any disclaimer, the term of this patent is extended or adjusted under 35 U.S.C. 154(b) by 697 days.

(21) Appl. No.: 17/840,049

(22) Filed: Jun. 14, 2022

(65) Prior Publication Data

US 2023/0398717 A1 Dec. 14, 2023

(51) Int. Cl.
*B28C 5/42* (2006.01)
*B28C 7/16* (2006.01)
*B65G 11/18* (2006.01)

(52) U.S. Cl.
CPC .............. *B28C 5/4248* (2013.01); *B28C 7/16* (2013.01); *B65G 11/186* (2013.01); *B65G 2201/04* (2013.01)

(58) Field of Classification Search
CPC ....... B28C 7/16; B28C 5/4248; B65G 11/186; B65G 2201/04; B07B 13/04
USPC ................ 366/53–59, 44, 68, 187; 239/159; 193/4–6, 10
See application file for complete search history.

(56) References Cited

U.S. PATENT DOCUMENTS

| 1,040,392 | A | * | 10/1912 | Ogle et al. | ........... | B65G 11/023 |
| | | | | | | 137/527.6 |
| 1,220,249 | A | * | 3/1917 | McWhorter | ........... | B65D 25/48 |
| | | | | | | 198/569 |
| 1,364,581 | A | * | 1/1921 | Ramsey | ............... | B65G 11/146 |
| | | | | | | 298/7 |
| 2,050,774 | A | * | 8/1936 | Wilcox | ................ | B65G 11/088 |
| | | | | | | 193/4 |
| 2,764,450 | A | * | 9/1956 | Rosener | .................. | E01C 19/15 |
| | | | | | | 298/7 |
| 3,249,192 | A | * | 5/1966 | Buskirk | ................ | B28C 5/4248 |
| | | | | | | 193/4 |
| 3,746,140 | A | * | 7/1973 | Schiffelbein | ......... | B65G 11/126 |
| | | | | | | 222/527 |
| 4,007,821 | A | * | 2/1977 | Schiffelbein | ............ | E04G 21/04 |
| | | | | | | 193/4 |
| 4,688,667 | A | * | 8/1987 | Peterson | ............. | E04G 21/0481 |
| | | | | | | 193/2 A |
| D314,270 | S | | 1/1991 | Bryant | | |
| 5,531,518 | A | * | 7/1996 | Alves | .................... | B28C 5/4248 |
| | | | | | | 366/68 |
| 5,732,753 | A | * | 3/1998 | Danzi | ................... | E04G 21/025 |
| | | | | | | 52/DIG. 1 |

(Continued)

FOREIGN PATENT DOCUMENTS

WO WO2009114150 9/2009

*Primary Examiner* — Charles Cooley

(57) ABSTRACT

A concrete mix separating device for generating cement slurry from a concrete mix includes a bar, which is insertable between adjacent sections of a concrete chute so that a gap is created between the adjacent sections. The bar is sized so that aggregate of a concrete mix, which passes through the concrete chute, is selectively excluded from passing through the gap. Cement slurry, which is substantially free of aggregate, is generated from the concrete mix and passes through the gap. A funnel is attached to the bar so that the funnel is positioned below the gap upon insertion of the bar between the adjacent sections of the concrete chute. The funnel directs the cement slurry into a receptacle, such as a bucket or a wheelbarrow, which is positioned below the funnel.

14 Claims, 6 Drawing Sheets

(56) References Cited

U.S. PATENT DOCUMENTS

| | | | | |
|---|---|---|---|---|
| 6,106,141 | A | * | 8/2000 | Bruun .................... B28C 5/4248 366/68 |
| 7,178,657 | B1 | * | 2/2007 | Hafen .................... B28C 5/4248 366/68 |
| 7,506,672 | B2 | | 3/2009 | Manno |
| 8,522,948 | B1 | * | 9/2013 | Galvin, IV ........... B65G 11/206 193/5 |
| D742,428 | S | * | 11/2015 | Barry ............................. D15/28 |
| 9,856,085 | B1 | * | 1/2018 | Workman ............ B65G 11/026 |
| 2008/0175092 | A1 | * | 7/2008 | Manno ...................... B07B 1/04 366/68 |
| 2009/0229706 | A1 | * | 9/2009 | Royce ................. E04G 21/0481 141/331 |
| 2009/0229707 | A1 | * | 9/2009 | Royce .................. B28C 5/4244 141/340 |
| 2011/0132996 | A1 | * | 6/2011 | Guthrie .................... B05B 1/20 239/159 |
| 2023/0398717 | A1 | * | 12/2023 | Hernandez ............ B28C 5/4248 |

* cited by examiner

CONCRETE MIX SEPARATING DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to separating devices and more particularly pertains to a new separating device for generating cement slurry from a concrete mix. The present invention discloses a separating device for generating cement slurry from concrete mix already onsite for a concrete project.

(2) Description of Related Art Including Information Disclosed Under 37 CFR 1.97 and 1.98

The prior art relates to separating devices, which may comprise filters that are attachable to ends of concrete chutes. Related prior art includes chutes, flexible tubes, hoppers, and the like, which are used to direct concrete mix from an end of a concrete chute, but do not separate cement slurry from the concrete mix. What is lacking in the prior art is a separating device comprising a bar and a funnel, wherein the bar creates a gap between the adjacent sections of a concrete chute and the funnel directs a cement slurry passing through the gap into a receptacle.

BRIEF SUMMARY OF THE INVENTION

An embodiment of the disclosure meets the needs presented above by generally comprising a bar, which is configured for insertion between adjacent sections of a concrete chute so that a gap is created between the adjacent sections. The bar is sized so that aggregate of a concrete mix, which passes through the concrete chute, is selectively excluded from passing through the gap. Cement slurry, which is substantially free of aggregate, is generated from the concrete mix and passes through the gap. A funnel is attached to the bar so that the funnel is positioned below the gap upon insertion of the bar between the adjacent sections of the concrete chute. The funnel is configured to direct the cement slurry into a receptacle, such as a bucket or a wheelbarrow, which is positioned below the funnel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
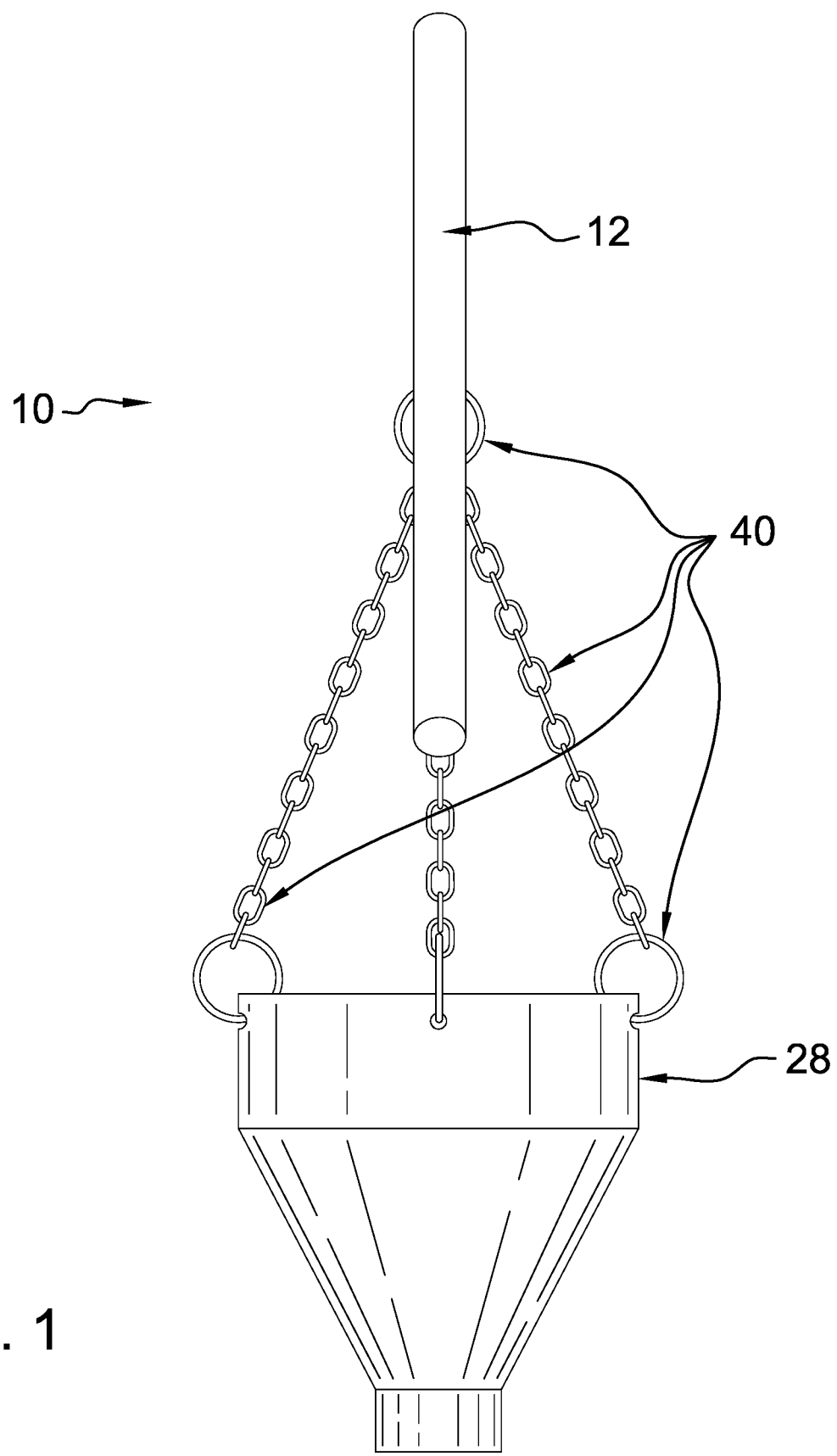
FIG. 1 is a front view of a concrete mix separating device according to an embodiment of the disclosure.

With reference now to the drawings, and in particular to FIGS. 1 through 7 thereof, a new separating device embodying the principles and concepts of an embodiment of the disclosure and generally designated by the reference numeral 10 will be described.

As best illustrated in FIGS. 1 through 7, the concrete mix separating device 10 generally comprises a bar 12, which is configured for insertion between adjacent sections 14 of a concrete chute 16 so that a gap 18 is created between the adjacent sections 14. The bar 12 may comprise wood, substantially rigid elastomer, or the like. It has been determined through experimentation that a bar 12 comprising metal is damaging to the concrete chute 16.

The bar 12 is sized so that aggregate 20 of a concrete mix 22, which passes through the concrete chute 16, is selectively excluded from passing through the gap 18. Cement slurry 24, which is substantially free of aggregate 20, is generated from the concrete mix 22 and passes through the gap 18. For example, we have determined that a bar 12, which is cylindrical and which has a diameter 26 of 1.90 cm, is useful in generating a gap 18 that is sized to substantially exclude aggregate 20 that is sized 2.54 cm or larger.

Figure 6:
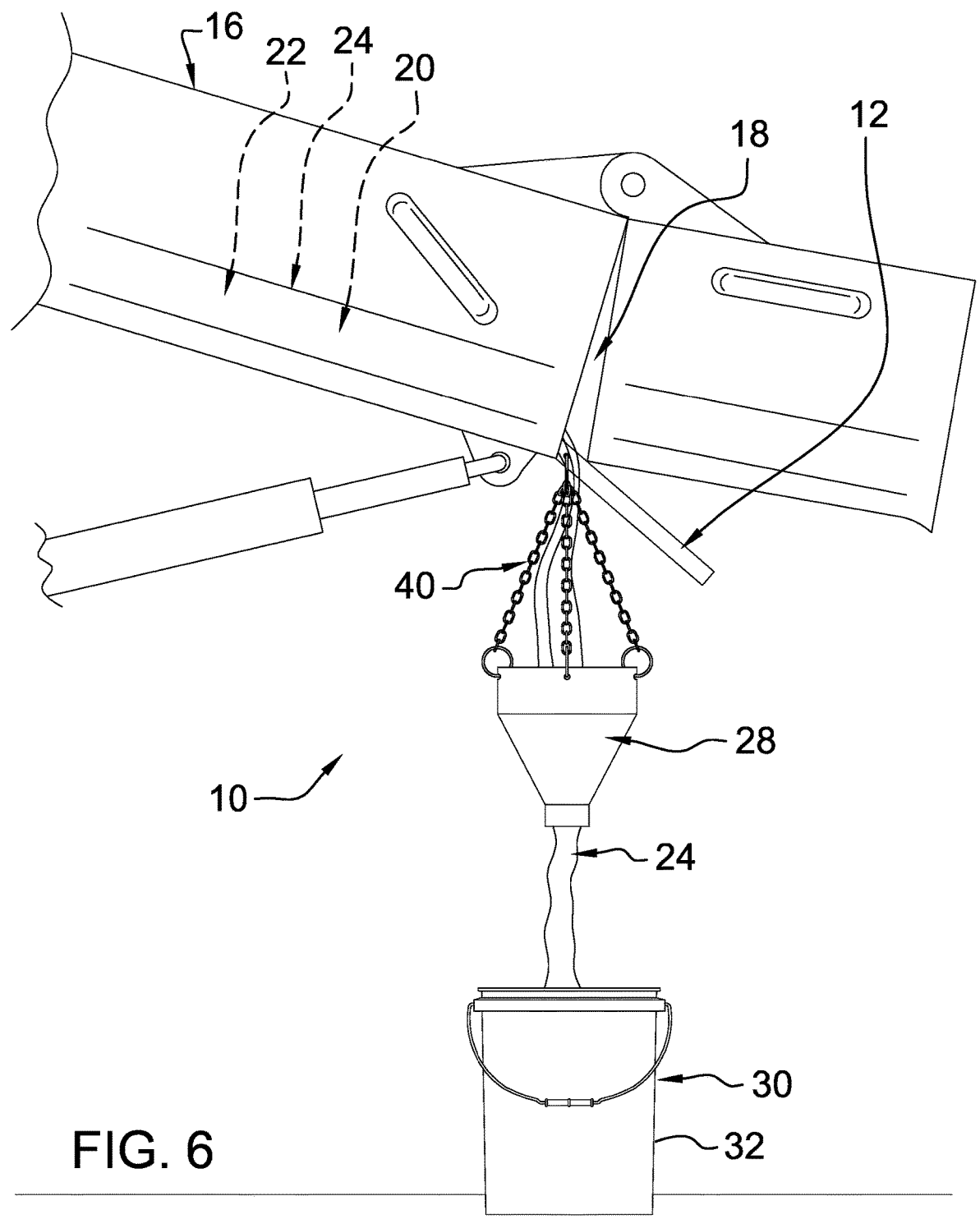
FIG. 6 is an in-use view of an embodiment of the disclosure.
Figure 7:
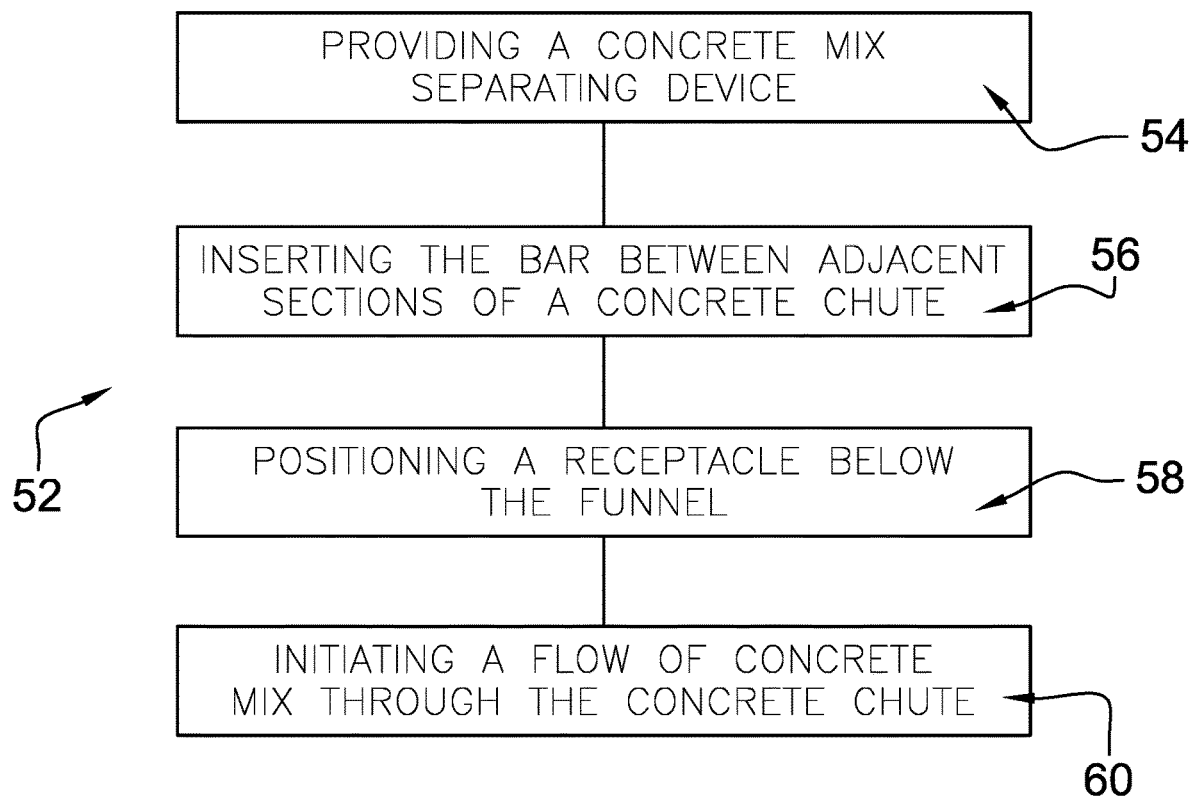
FIG. 7 is a flow diagram for a method utilizing an embodiment of the disclosure.

A funnel 28 is attached to the bar 12 so that the funnel 28 is positioned below the gap 18 upon insertion of the bar 12 between the adjacent sections 14 of the concrete chute 16. The funnel 28 is configured to direct the cement slurry 24 into a receptacle 30, such as a bucket 32, as shown in FIG. 6, a wheelbarrow, or the like, which is positioned below the funnel 28. The funnel 28 serves to limit splashing of the cement slurry 24 onto adjacent surfaces as it passes from the concrete chute 16 to the receptacle 30. The cement slurry 24 that is generated is useful in finishing work for a concrete project and can be conveniently generated, using the concrete mix separating device 10, from concrete mix 22 that already is onsite for the concrete project.

The funnel 28 comprises an upper section 34 and a lower section 36, which is circumferentially smaller than the upper section 34. A medial section 38 is attached to and extends between the upper section 34 and the lower section 36. The upper section 34 and the lower section 36 may be cylindrical, with the medial section 38 being conical, as shown in FIG. 1. The present invention also anticipates the upper section 34 and the lower section 36 being alternatively shaped, such as rectangular, oval, and the like, with the medial section 38 being complementarily shaped.

Figure 2:
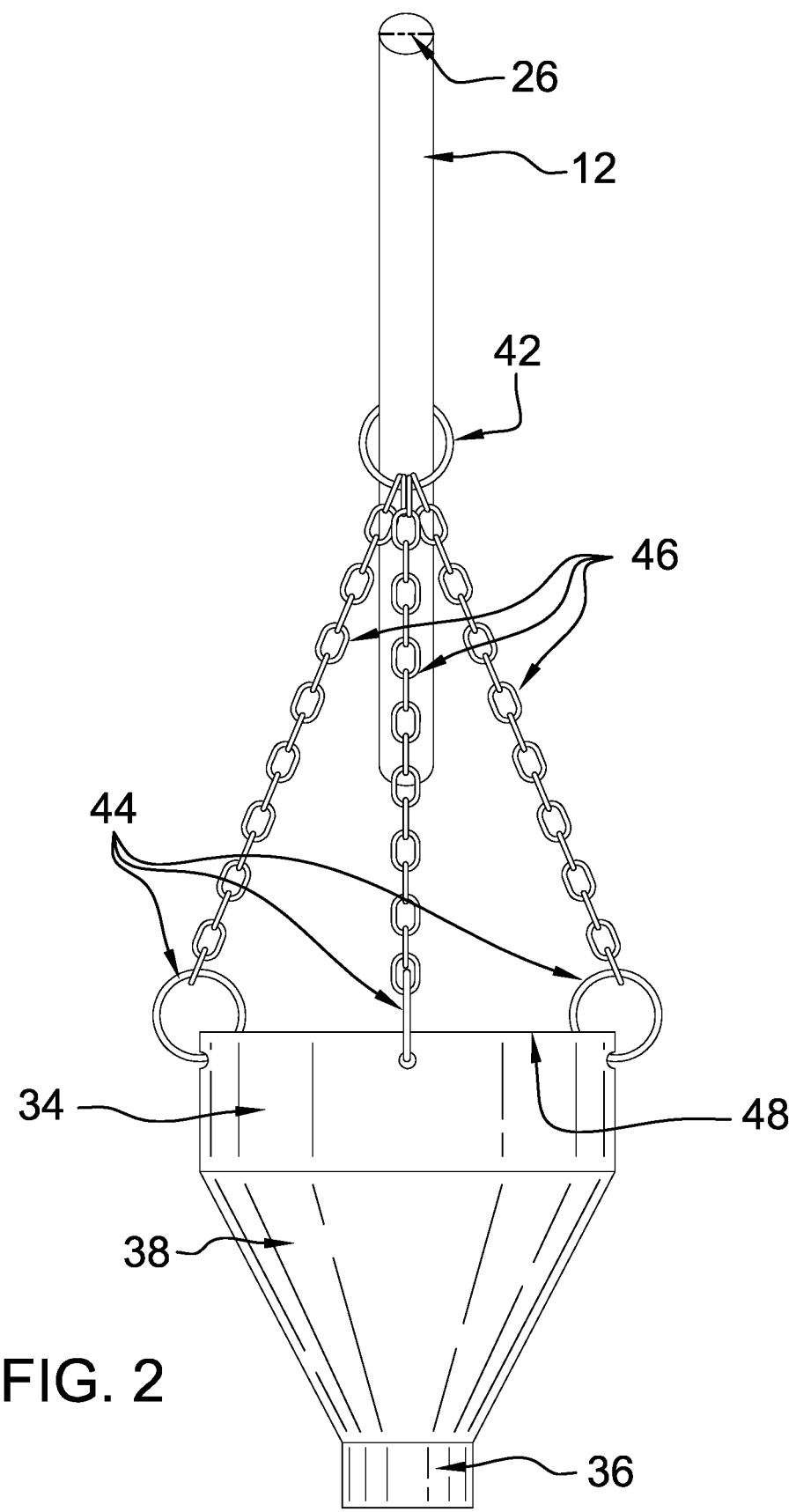
FIG. 2 is a rear view of an embodiment of the disclosure.
Figure 3:
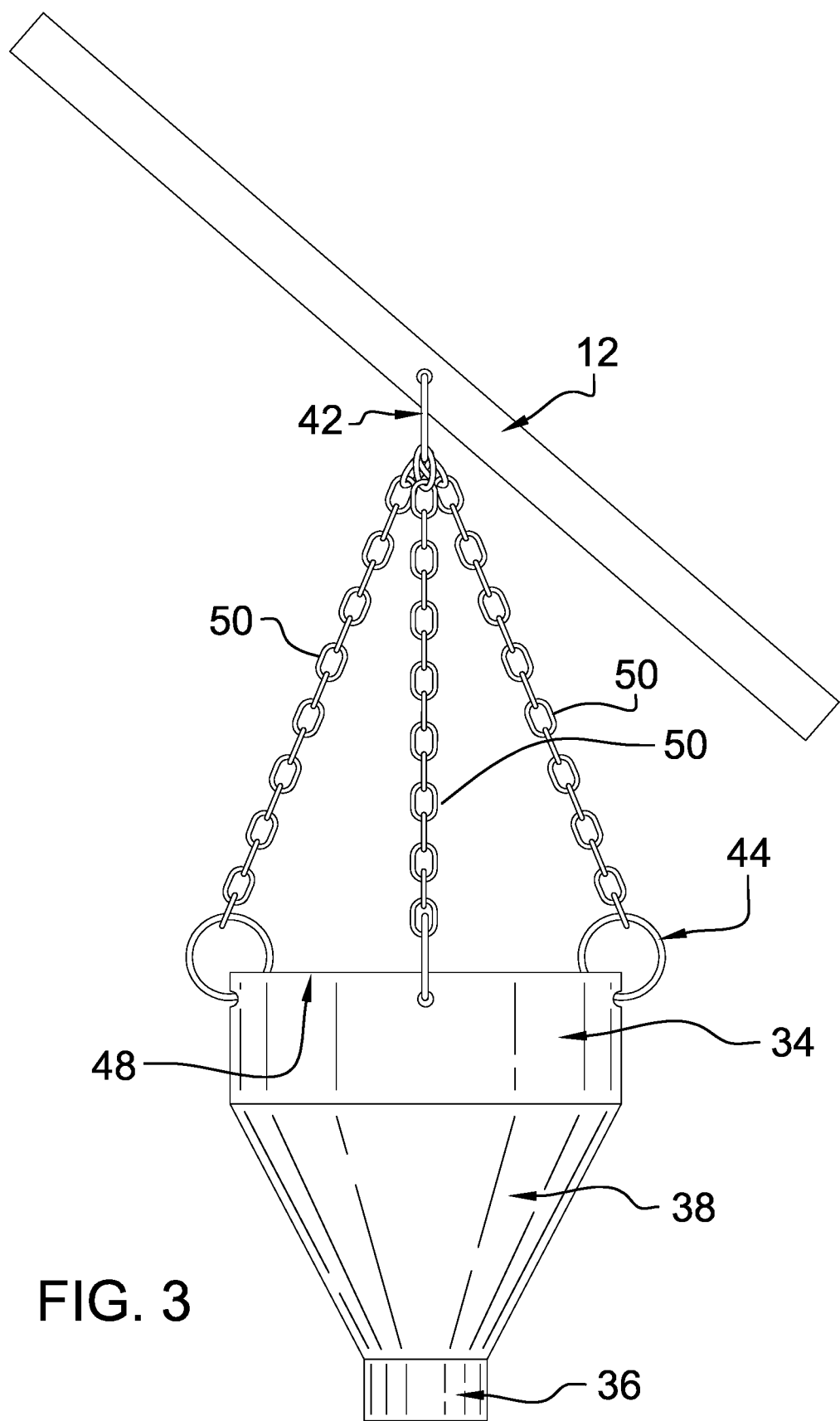
FIG. 3 is a side view of an embodiment of the disclosure.
Figure 4:
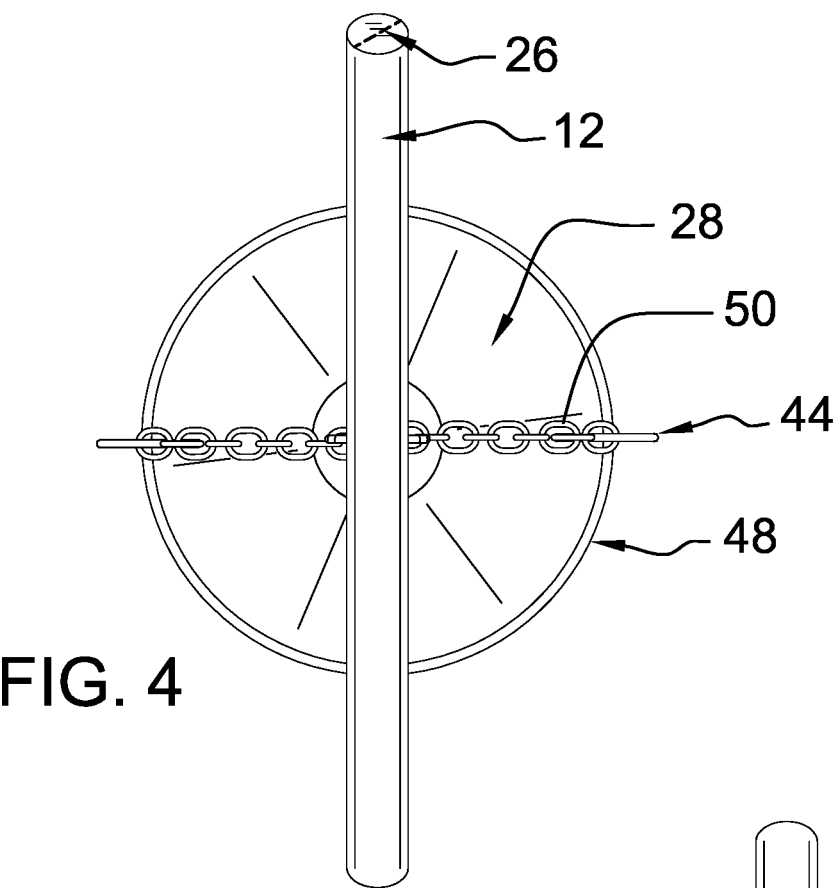
FIG. 4 is a top view of an embodiment of the disclosure.
Figure 5:
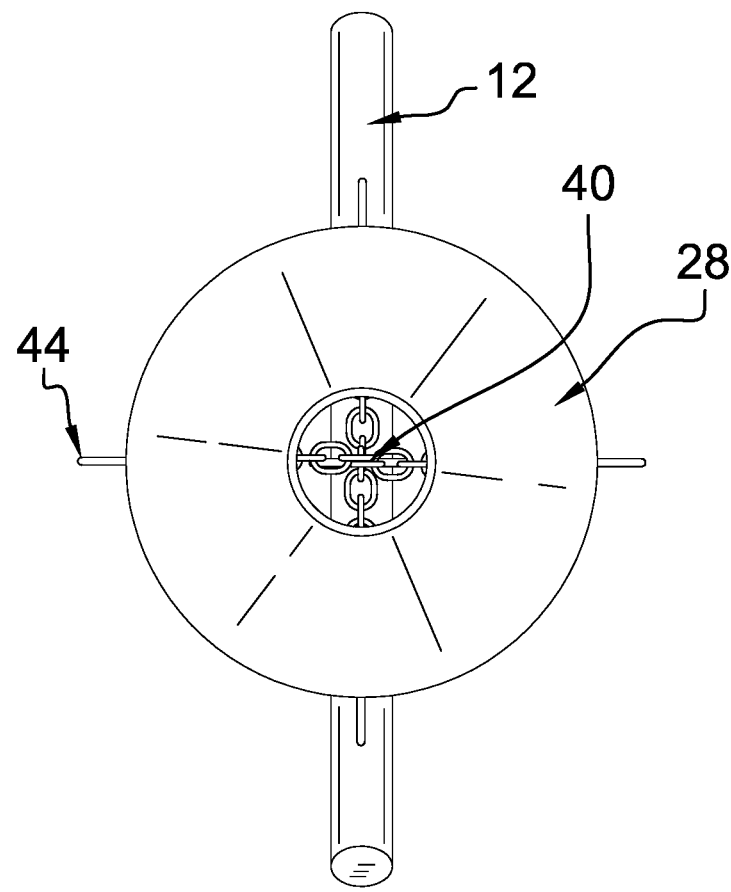
FIG. 5 is a bottom view of an embodiment of the disclosure.

As shown in FIG. 3, a tethering assembly 40 is attached to and extends between the bar 12 and the funnel 28. The funnel 28 thus is suspended below the gap 18 upon insertion of the bar 12 between the adjacent sections 14 of the concrete chute 16, as shown in FIG. 6. The tethering assembly 40 may comprise a first ring 42, a plurality of second rings 44, and a plurality of tethers 46. The first ring 42 is hingedly attached to the bar 12, while each second ring 44 is hingedly attached to the funnel 28 proximate to an upper end 48 of the funnel 28. Each tether 46 is attached to and extends between a respective second ring 44 and the first ring 42. Each tether 46 may comprise a chain 50, as shown in FIG. 2, a cable, or the like.

In use, the concrete mix separating device 10 enables a method of generating cement slurry from a concrete mix 52. The method 52 comprises a first step 54 of providing a concrete mix separating device 10 according to the specification above. A second step 56 of the method 52 is inserting the bar 12 between adjacent sections 14 of a concrete chute 16 so that the funnel 28 is positioned below the gap 18. A third step 58 of the method 52 is positioning a receptacle 30 below the funnel 28. A fourth step 60 of the method 52 is initiating a flow of concrete mix 22 through the concrete chute 16 so that cement slurry 24 collects in the receptacle 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A concrete mix separating device comprising:
a bar configured for insertion between adjacent sections of a concrete chute, such that a gap is created between the adjacent sections such that cement slurry substantially free of aggregate passes through the gap;
a funnel attached to the bar, such that the funnel is positioned below the gap upon insertion of the bar between the adjacent sections of the concrete chute, wherein the funnel is configured for directing the cement slurry into a receptacle positioned below the funnel;
a tethering assembly attached to the bar and the funnel and extending between the bar and the funnel, such that the funnel is suspended below the gap upon insertion of the bar between the adjacent sections of the concrete chute; and
wherein the tethering assembly comprises:
a first ring hingedly attached to the bar;
a plurality of second rings, each second ring being hingedly attached to the funnel proximate to an upper end of the funnel; and
a plurality of tethers, each tether being attached to and extending between a respective second ring and the first ring.

2. The concrete mix separating device of claim 1, wherein the bar comprises wood.

3. The concrete mix separating device of claim 1, wherein the funnel comprises:
an upper section;
a lower section, the lower section being circumferentially smaller than the upper section; and
a medial section attached to and extending between the upper section and the lower section.

4. The concrete mix separating device of claim 3, wherein:
the upper section and the lower section are cylindrical; and
the medial section is conical.

5. The concrete mix separating device of claim 1, wherein each tether comprises a chain.

6. A concrete mix separating device comprising:
a bar configured for insertion between adjacent sections of a concrete chute, such that a gap is created between the adjacent sections such that cement slurry substantially free of aggregate passes through the gap, the bar comprising wood;
a funnel attached to the bar, such that the funnel is positioned below the gap upon insertion of the bar between the adjacent sections of the concrete chute, wherein the funnel is configured for directing the cement slurry into a receptacle positioned below the funnel, the funnel comprising:
an upper section, the upper section being cylindrical, a lower section, the lower section being circumferentially smaller than the upper section, the lower section being cylindrical, and
a medial section attached to and extending between the upper section and the lower section, the medial section being conical; and
a tethering assembly attached to the bar and the funnel and extending between the bar and the funnel, such that the funnel is suspended below the gap upon insertion of the bar between the adjacent sections of the concrete chute, the tethering assembly comprising:
a first ring hingedly attached to the bar, a plurality of second rings, each second ring being hingedly attached to the funnel proximate to an upper end of the funnel, and a plurality of tethers, each tether being attached to and extending between a respective second ring and the first ring, each tether comprising a chain.

7. A method of generating cement slurry from a concrete mix, the method comprising the steps of:

providing a concrete mix separating device comprising:

a bar configured for insertion between adjacent sections of a concrete chute, such that a gap is created between the adjacent sections such that cement slurry substantially free of aggregate passes through the gap, and a funnel attached to the bar, such that the funnel is positioned below the gap upon insertion of the bar between the adjacent sections of the concrete chute, wherein the funnel is configured for directing the cement slurry into a receptacle positioned below the funnel;

inserting the bar between adjacent sections of a concrete chute, such that the funnel is positioned below the gap;

positioning a receptacle below the funnel; and initiating a flow of concrete mix through the concrete chute, such that cement slurry collects in the receptacle.

8. The method of claim 7, wherein the receptacle comprises a bucket or a wheelbarrow.

9. The method of claim 7, wherein the bar comprises wood.

10. The method of claim 7, wherein the funnel comprises:

an upper section;

a lower section, the lower section being circumferentially smaller than the upper section; and a medial section attached to and extending between the upper section and the lower section.

11. The method of claim 10, wherein:

the upper section and the lower section are cylindrical; and the medial section is conical.

12. The method of claim 7, further including a tethering assembly attached to the bar and the funnel and extending between the bar and the funnel, such that the funnel is suspended below the gap upon insertion of the bar between the adjacent sections of the concrete chute.

13. The method of claim 7, wherein the tethering assembly comprises:

a first ring hingedly attached to the bar;

a plurality of second rings, each second ring being hingedly attached to the funnel proximate to an upper end of the funnel; and a plurality of tethers, each tether being attached to and extending between a respective second ring and the first ring.

14. The method of claim 13, wherein each tether comprises a chain.

* * * * *